US010829287B2

(12) United States Patent
Schoonderbeek et al.

(10) Patent No.: US 10,829,287 B2
(45) Date of Patent: Nov. 10, 2020

(54) POUCH ASSEMBLY FOR HOLDING AN AQUEOUS UREA SOLUTION FOR USE IN AN SCR SYSTEM FOR TREATING THE EXHAUST GASES OF AN INTERNAL COMBUSTION ENGINE OF A VEHICLE AND SYSTEM FOR TREATING THE EXHAUST GASES OF AN INTERNAL COMBUSTION ENGINE OF A VEHICLE USING THE AQUEOUS UREA SOLUTION

(71) Applicant: YARA INTERNATIONAL ASA, Oslo (NO)

(72) Inventors: Jeroen Schoonderbeek, Lasne (BE); Sigurd Jørgensen, Oslo (NO)

(73) Assignee: Yara International ASA, Oslo (NO)

( * ) Notice: Subject to any disclaimer, the term of this patent is extended or adjusted under 35 U.S.C. 154(b) by 0 days.

(21) Appl. No.: 16/069,905

(22) PCT Filed: Feb. 3, 2017

(86) PCT No.: PCT/EP2017/052467
§ 371 (c)(1),
(2) Date: Jul. 13, 2018

(87) PCT Pub. No.: WO2017/134277
PCT Pub. Date: Aug. 10, 2017

(65) Prior Publication Data
US 2019/0084742 A1    Mar. 21, 2019

(30) Foreign Application Priority Data

| Feb. 4, 2016 | (EP) | ................................... | 16154333 |
| Feb. 4, 2016 | (EP) | ................................... | 16154336 |
| Sep. 23, 2016 | (EP) | ................................... | 16190446 |

(51) Int. Cl.
*B65D 33/38* (2006.01)
*B65D 75/58* (2006.01)
(Continued)

(52) U.S. Cl.
CPC ..... *B65D 75/5883* (2013.01); *B01D 53/9418* (2013.01); *F01N 3/035* (2013.01);
(Continued)

(58) Field of Classification Search
CPC ... B65D 75/5883; F01N 13/009; F01N 3/035; F01N 3/0842; F01N 3/2066; F01N 3/2896; B01D 53/9418
See application file for complete search history.

(56) References Cited

U.S. PATENT DOCUMENTS

2004/0112915 A1    6/2004    Franczyk
2011/0147421 A1    6/2011    Bonet
(Continued)

FOREIGN PATENT DOCUMENTS

CL    199901121 A1    11/1999
CL    2004000689 A1    1/2005
(Continued)

OTHER PUBLICATIONS

Chilean Office Action dated Oct. 28, 2019 from Chilean Patent Application No. 201801990.
(Continued)

*Primary Examiner* — P. Macade Nichols
(74) *Attorney, Agent, or Firm* — Amster, Rothstein & Ebenstein LLP

(57) ABSTRACT

The application relates to a pouch assembly (100) containing a liquid being an aqueous urea solution for use in a selective catalytic reduction system for treating the exhaust gases of an internal combustion engine of a vehicle and for transferring the liquid to a liquid tank of the vehicle from the outside (Continued)

of the liquid tank, the pouch assembly (100) comprising a flexible pouch (1) and a spout (2) attached thereto having a base (21) extending axially through an opening (111) provided in a wall of the pouch (1) and being attached to the opening (111), a top end (22) being configured for insertion in the inside passage of the filling neck (3) of the liquid tank during the filling of the liquid tank, and a body (23) that extends between the base (21) and the top end (22) of the spout (2), the body (23) having an elongated shape, and the body (23) at least partially extending in the inside passage of the filling neck (3) of the liquid tank during the filling of the liquid tank, the base (21), the top end (22) and the body (23) having an elongated axial through-passage (211) to serve as a discharge passage for the liquid. The application relates furthermore to a system comprising such a pouch assembly (100) and a liquid tank having a filling neck (3) allowing insertion of the spout (2) for filling the liquid tank.

13 Claims, 4 Drawing Sheets

(51) Int. Cl.
    *F01N 3/20*     (2006.01)
    *F01N 13/00*     (2010.01)
    *F01N 3/035*     (2006.01)
    *F01N 3/08*     (2006.01)
    *B01D 53/94*     (2006.01)
    *F01N 3/28*     (2006.01)

(52) U.S. Cl.
    CPC ......... *F01N 3/0842* (2013.01); *F01N 3/2066* (2013.01); *F01N 3/2896* (2013.01); *F01N 13/009* (2014.06); *B65D 2575/583* (2013.01); *F01N 2610/02* (2013.01); *F01N 2610/142* (2013.01); *F01N 2610/1406* (2013.01); *F01N 2610/1413* (2013.01); *Y02A 50/20* (2018.01); *Y02T 10/12* (2013.01)

(56) References Cited

U.S. PATENT DOCUMENTS

| | | | |
|---|---|---|---|
| 2015/0048112 A1* | 2/2015 | Skillin | B65D 75/5816 |
| | | | 222/107 |
| 2016/0003122 A1 | 1/2016 | Ham et al. | |
| 2016/0257082 A1* | 9/2016 | Ragan | B65D 75/008 |

FOREIGN PATENT DOCUMENTS

| | | |
|---|---|---|
| CL | 2011000114 | 4/2011 |
| CL | 2011000114 A1 | 4/2011 |
| CL | 2018001794 A1 | 9/2018 |
| CN | 105298595 A | 2/2016 |
| DE | 10 2014 225119 A1 | 1/2016 |
| ES | 2 300 230 A1 | 6/2008 |
| JP | H11 263355 A | 9/1999 |
| JP | 2004 131086 A | 4/2004 |
| WO | 01/23264 A1 | 4/2001 |
| WO | 2010006943 A1 | 1/2010 |
| WO | 2017134276 A1 | 8/2017 |

OTHER PUBLICATIONS

PCT International Search Report and Written Opinion dated Mar. 24, 2017 for PCT International Patent Application PCT/EP2017/052467, 12 pages.

* cited by examiner

POUCH ASSEMBLY FOR HOLDING AN AQUEOUS UREA SOLUTION FOR USE IN AN SCR SYSTEM FOR TREATING THE EXHAUST GASES OF AN INTERNAL COMBUSTION ENGINE OF A VEHICLE AND SYSTEM FOR TREATING THE EXHAUST GASES OF AN INTERNAL COMBUSTION ENGINE OF A VEHICLE USING THE AQUEOUS UREA SOLUTION

CROSS-REFERENCE TO RELATED APPLICATIONS

This application is a U.S. national stage entry under 35 U.S.C. § 371 of PCT International Patent Application No. PCT/EP2017/052467, filed Feb. 3, 2017, which claims priority to European Patent Application No. 16154333.5, filed Feb. 4, 2016, European Patent Application No. 16154336.8, filed Feb. 4, 2016, and European Patent Application No. 16190446.1, filed Sep. 23, 2016, the contents of which are incorporated herein by reference in their entirety.

TECHNICAL FIELD

This disclosure relates generally to the technical field of reducing nitrogen oxides ($NO_x$) emissions in the exhaust gases of combustion engines of vehicles by means of a selective catalytic reduction (SCR) system using an aqueous urea solution.

A known application lies in the field of passenger vehicles with internal combustion engines equipped with SCR technology for reducing $NO_x$ emissions. These vehicles have an aqueous urea solution tank separate from the fuel tank.

The disclosure more specifically relates to disposable, portable containers for storing the aqueous urea solution. An example of such a container is a flexible pouch with a spout for dispensing the aqueous urea solution out of the flexible pouch into the aqueous urea solution tank of a vehicle.

BACKGROUND

The standards aimed at reducing pollutant emissions generated by motor vehicles are becoming more and more severe. The motor vehicle manufacturers are constantly forced to evolve their technologies in order to comply with these standards. Such standards are amongst others aimed at reducing the discharge of $NO_x$ into the atmosphere.

In order to limit the $NO_x$ emissions, the motor vehicle manufacturers, and at this moment more specifically the diesel engine manufacturers, are more and more making use of the SCR treatment system which allows nitrogen oxides to be reduced through a reducing agent, such as ammonia, in the exhaust line of the vehicle internal combustion engine. This ammonia in general is coming from the thermal decomposition of an aqueous urea solution which is directly injected into the exhaust line of the vehicle internal combustion engine.

A known SCR treatment system comprises a reservoir containing an aqueous urea solution that is fixed to the vehicle separate from the fuel reservoir. Furthermore, the SCR treatment system comprises a $NO_x$ catalyst situated in the exhaust line, and an injection device for the aqueous urea solution which is connected to the reservoir and which is designed to inject the aqueous urea solution into the exhaust line of the engine upstream of the $NO_x$ catalyst. The aqueous urea solution that is injected into the exhaust line is converted into ammonia because of the high temperature in this exhaust line. The ammonia thus obtained then reacts, in the NOx catalyst, with the nitrogen oxides resulting from combustion in the vehicle engine so that these oxides are converted by the catalytic reduction into nitrogen ($N_2$) (which no longer presents a danger to the environment), and water ($H_2O$).

AUS32 (according to ISO 22241) is a well-known aqueous urea solution, produced from demineralized water and high-purity urea. In most parts of the world, AUS32 is known as AdBlue®. In North America however, it is known as DEF while in Brazil, it is known as ARLA32. The urea content lies between 31.8% and 33.2% by weight (i.e. 32.5 weight %±0.7 weight %), hence implying an available amount of ammonia between 18.0% and 18.8%. AUS32 is a non-toxic solution that transforms harmful $NO_x$ emissions from internal combustion engines of vehicles into harmless water vapor and nitrogen. The AUS32 is filled into a dedicated AUS32 tank, which is a tank that is separate from the fuel tank.

Already a number of disposable, portable containers with numerous sizes and capacities are known for storing such liquid urea solutions and distribution to the end user, normally being the vehicle driver. An example of such a container is a flexible pouch that is provided with a spout for dispensing the liquid urea solution as contained in the flexible pouch out of the pouch into the liquid urea solution tank of the vehicle from the outside of the liquid urea solution tank via a filling neck of the liquid urea solution tank.

An example of such a flexible pouch that was produced by BASF some years ago is a stand-up pouch with a content of 5 liter of AdBlue®. The stand-up pouch consists of a flexible pouch having a standard, widely available short weld-spout located at the center, top end of the 5 liter pouch. This short weld-spout consists of a base that is integrated into an orifice in the outer edge of the flexible pouch and that is attached to the orifice via welding, and a top end that is directly connected to the base and that is provided with screw thread for screwing on and off a closure cap.

The disadvantage of the flexible pouch as described above is that it is a standard, off-the-shelf pouch having a standard, short spout. If such standard, short spout were to be used to fill the liquid urea solution tank of a vehicle having an onboard tank filling neck with a standard diameter of 19 mm, there is a large risk of spillage of the liquid urea solution when filling the liquid urea solution tank of the vehicle. The short spout, combined with the heavy weight of a filled pouch, could easily result in the accidental pouring of liquid urea solution outside the onboard tank filling neck. Aside from the unpleasant smell and mess such a spill would generate, there is the very likely risk of corrosion damages to the vehicle, since AUS32 has corrosive properties. Hence, it can be argued that the BASF 5 liter flexible pouch is not in compliance with the ISO 22241-5 norm, that can be summarized as follows:

"The refilling system specified in this part of ISO 22241 has been developed in accordance with passenger vehicle manufacturer's specifications. The functional requirements include a filling system that has minimal obtrusive odors, has minimal spill risk, limits pressure build-up and includes mismatch prevention. The system should be designed to prevent the deleterious effects of AUS 32, including, but not limited to, uncontrolled flow into gaps in body work with the potential to cause corrosion, smell nuisance and crystal formation."

An objective is therefore to provide a flexible pouch with a spout that has a reduced spillage risk in the filling of the liquid urea solution into the liquid urea solution tank of vehicles.

It is a further objective to provide a flexible pouch with a spout that optimizes the ease-of-use to the user, that allows an ergonomic handling of the pouch with the spout by the end user and that provides an efficient travelling through the supply chain, including the point-of-sale.

SUMMARY OF THE INVENTION

According to one aspect of the application, a pouch assembly is described comprising a flexible pouch containing a liquid that is an aqueous urea solution for use in a selective catalytic reduction system for treating the exhaust gases of an internal combustion engine of a vehicle. The pouch assembly is adapted for transferring the liquid in the flexible pouch to a liquid urea solution tank of the vehicle from the outside of the liquid urea solution tank. The pouch assembly comprises a flexible pouch and a spout attached thereto. At least a part of the spout extends outside the flexible pouch which spout is arranged to dispense liquid urea solution contained in the flexible pouch into the liquid urea solution tank of the vehicle via a tank filling neck. The tank filling neck is configured to receive the spout. More in particular, the tank filling neck has an inside passage into which the spout can at least partially extend or be inserted during the filling of the liquid urea solution tank. The spout comprises a base having an elongated axial through-passage to serve as a discharge passage for the liquid urea solution, the base extending axially through an opening provided in a wall of the pouch and being attached in fixed relation to the opening. The base is in sealing connection with the opening, such that liquid contained in the pouch passes through the flexible pouch opening and through the base elongated axial through-passage. The spout further comprises a top end having an elongated axial through-passage in fluid connection with the base elongated axial through-passage; it also serves as a discharge passage for the liquid urea solution. The top end of the spout is insertable into the inside passage of the filling neck of the liquid urea solution vehicle tank for the filling of the liquid urea solution tank. The spout further comprises a body that extends between the base and the top end of the spout, that has an elongated shape, that has an elongated through-passage in fluid connection with base and top end elongated axial through-passages; it serves also as a discharge passage for the liquid urea solution. The spout body is configured to at least partially extend into the inside passage of the tank filling neck for the filling of the liquid urea solution tank.

The body of the spout thus has an elongated shape. The term "elongated" means "having a length that is greater than the width". Reference to an axial length or direction refers to the longer length of the elongated shape. This elongated shape of the spout ensures that during filling, not only the top end of the spout is located into the tank filling neck but also part of the body or the whole body.

Furthermore, since the spout body has an elongated shape, during the insertion of the spout into the tank filling neck, the spout is guided into the tank filling neck. This allows an easy insertion of the spout into the tank filling neck.

Also, since the top end of the spout during filling is located inside the filling neck of the liquid urea solution tank of the vehicle, liquid urea solution is prevented from running out of the filling neck of the liquid urea solution tank during the filling process, also reducing or even removing the spillage risk.

This pouch arrangement furthermore has a simple design, a limited production cost, a limited weight and a limited plastic content.

In a possible embodiment, the spout is made in one piece. In other words, the base, the body and the top end are non-releasably connected to each other. This has the advantage that only a single spout has to be designed and produced. Furthermore, no additional manufacturing steps need to be performed by the manufacturer, nor any additional operation steps need to be performed by the end user. Making the spout out of one piece also has the advantage in the storing of the flexible pouches since there is the possibility that certain parts of the spout disconnect for instance upon transport or storage is minimized.

In an embodiment of a pouch assembly according to the application, the base of the spout is permanently attached to the opening provided in the wall of the flexible pouch. Also here the advantage lies in the storing of the pouches as mentioned in the preceding paragraph.

In a possible embodiment of a pouch assembly according to the application, a longitudinal central axis of the spout is disposed in an upward direction when the flexible pouch is considered in an upright position.

In an embodiment of a pouch assembly, the body of the spout has a lower end that is connected to the base of the spout and an upper end that is connected to the top of the spout, wherein the body has one or more regions of gradual diameter reduction from the lower end to the upper end thereof. In other words, the body may contain one or more regions that are tapered, the wider end of the taper being towards the lower end of the body.

The gradually decreasing diameter assists in easy insertion into the tank filling neck and furthermore that the spout has a shape such that it fits adequately into the tank filling neck.

In a possible embodiment of a pouch assembly, the body of the spout is divided over its length in a first body part and a second body part. The first and second body parts may each contain a region of gradual diameter reduction from the lower end to the upper end, a graduality of diameter reduction in the second body part being greater than that in first body part. In other words, the decrease in diameter of the second body part towards the upper end of the body of the spout may be larger than the decrease in diameter of the first body part starting from the lower end of the body of the spout.

This form of the spout is suitable for an easy insertion of the spout into the tank filling neck and for fitting in an appropriate way into the tank filling neck during the filling of the liquid urea solution tank of the vehicle.

A further disadvantage of the pouch as commercialized by BASF (as described above) is its overall design with the short spout centered at the top of the pouch, which in itself, combined with the heavier weight of the 5 liter content, would make it less easy to handle and therefore make accidental spillage more likely.

Furthermore, this design makes the packaging properties of the pouch less efficient throughout the supply chain as it takes up more space, both in transport cartons and on-shelf at point of sale, thereby causing costly inefficiencies both from a cost and environmental perspective.

This problem is solved by an embodiment of a pouch assembly comprising a flexible pouch and a spout wherein the wall of the flexible pouch comprises a first part that includes the opening into which the base of the spout is integrated, this part being planar and obliquely arranged with respect to a horizontal plane when the pouch assembly is considered in an upright (stand-up) position. The horizontal plane may be parallel to a base of the flexible pouch, which base is essentially flat providing a standing support.

This oblique and optionally planar first part of the wall of the flexible pouch assists in ease of tilting of the flexible pouch towards the liquid urea solution tank of the vehicle in order to transfer liquid therefrom and is in an ideal position during the transfer of liquid to the liquid urea solution tank.

In a possible embodiment of a pouch assembly, the flexible pouch is configured such that the spout is attached to the first part of the flexible pouch wall, this first part disposed between adjacent second and third parts of the flexible pouch wall, wherein each of the first, second and third parts are oriented such that fictive planes contacting and extending from each of the first, second and third parts intersect to form a geometric space. The geometric space may have a triangular profile (cross section). The geometric space may have triangular prism shape. The top end of the spout, more specifically the top end of the spout together with the cap, even more specifically, the body of the spout together with the cap are contained within the geometric space.

According to one aspect, the flexible pouch has an essentially cuboid shape, wherein the spout is disposed on a chamfered edge between two faces, and the geometric space is formed by the intersection of fictive planes contacting and extending from each of the chamfered edges and the faces.

This has the advantage that the pouch assembly can efficiently be packaged into transport cartons or pallet configuration as well as can have an efficient on-the-shelf space in a point-of sale.

In an embodiment of a pouch assembly, the outer body of the spout and/or the top end of the spout have an essentially cylindrical outer shape. The diameter of the cylinder may or may not be uniform as a function of its length.

Since the shape of the tank filling neck is also cylindrical, it is most convenient that also the body of the spout and most likely also the top end of the spout have a cylindrical outer shape.

In an embodiment of a pouch assembly, the body of the spout extends completely into the inside passage of the filling neck of the liquid urea solution tank of the vehicle when the spout is inserted into the filling neck for filling the vehicle tank at least partially with the liquid urea solution contained in the pouch.

This increases the advantage that the spout cannot easily fall out of the filling neck of the liquid urea solution tank during the filling thereof.

In a possible embodiment of a pouch assembly, the spout and the cap are each provided with a co-operating screw thread for repeatable releasable attachment of the screw the cap to the spout.

This has the advantage that, when the flexible pouch has been partially emptied, the fluid can be stored in the pouch assembly until a subsequent transfer of fluid to the liquid urea solution tank is necessary.

In a possible embodiment, the cap is provided with a tamper-evidence ring that maintains connection with the cap when the cap is unscrewed from the spout. This removes the risk that the tamper-evidence ring could accidentally fall off the spout and into the liquid urea solution tank during the filling thereof.

In an embodiment of a pouch assembly, the spout body has a length that is between 5 and 10 times the length of the base of the spout.

In an embodiment of a pouch assembly, the body has a length that is between 2 and 6 times the length of the top end of the spout.

In an embodiment of a pouch assembly, the first body part has a length that is between 0.5 and 2 times the length of the second body part of the spout.

According to a further aspect of the application, a system for treating the exhaust gases of an internal combustion of a vehicle using a liquid urea solution, the system comprising:
 a liquid urea solution tank located in the vehicle, the liquid urea solution tank having a tank filling neck for filling the liquid urea solution tank with the liquid urea solution from the outside of the liquid urea solution tank, and
 a pouch assembly as described herein.

According to a further aspect of the application, a system for treating the exhaust gases of an internal combustion of a vehicle using a liquid urea solution is disclosed, the system comprising a liquid urea solution tank located in the vehicle, the liquid urea solution tank having a tank filling neck for filling the tank with liquid urea solution from the outside of the liquid urea solution tank, and a pouch assembly for containing a liquid that is an aqueous urea solution for use in a selective catalytic reduction system for treating the exhaust gases of an internal combustion engine of a vehicle and for transferring the liquid to a liquid urea solution tank of the vehicle from the outside of the liquid urea solution tank with liquid urea solution contained in the pouch, the pouch assembly comprising a flexible pouch and a spout attached thereto wherein which at least a part of the pouch extends outside the flexible pouch and that is arranged to dispense liquid urea solution contained in the flexible pouch out of the flexible pouch into the liquid urea solution tank of the vehicle via the tank filling neck that has an inside passage into with the spout partially extends during the filling of the liquid urea solution tank, wherein the spout comprises a base having an elongated axial through-passage to serve as a discharge passage for the liquid urea solution, the base extending axially through an opening provided in an outer wall of the pouch and being attached to the opening, and a top end having an elongated axial through-passage to serve as a discharge passage for the liquid urea solution, the top end being configured for insertion into the tank filling neck during the filling of the liquid urea solution tank, wherein the spout further comprises a body that extends between the base and the top end of the spout, that has an elongated shape, that has an elongated through-passage to serve as a discharge passage for the liquid urea solution, and is configured to at least partially extend into the tank filling neck for the transfer of liquid into the liquid urea solution tank.

In a possible embodiment of a system, the system comprises a flexible pouch according to the application as described above.

DETAILED DESCRIPTION OF THE INVENTION

Figure 1:
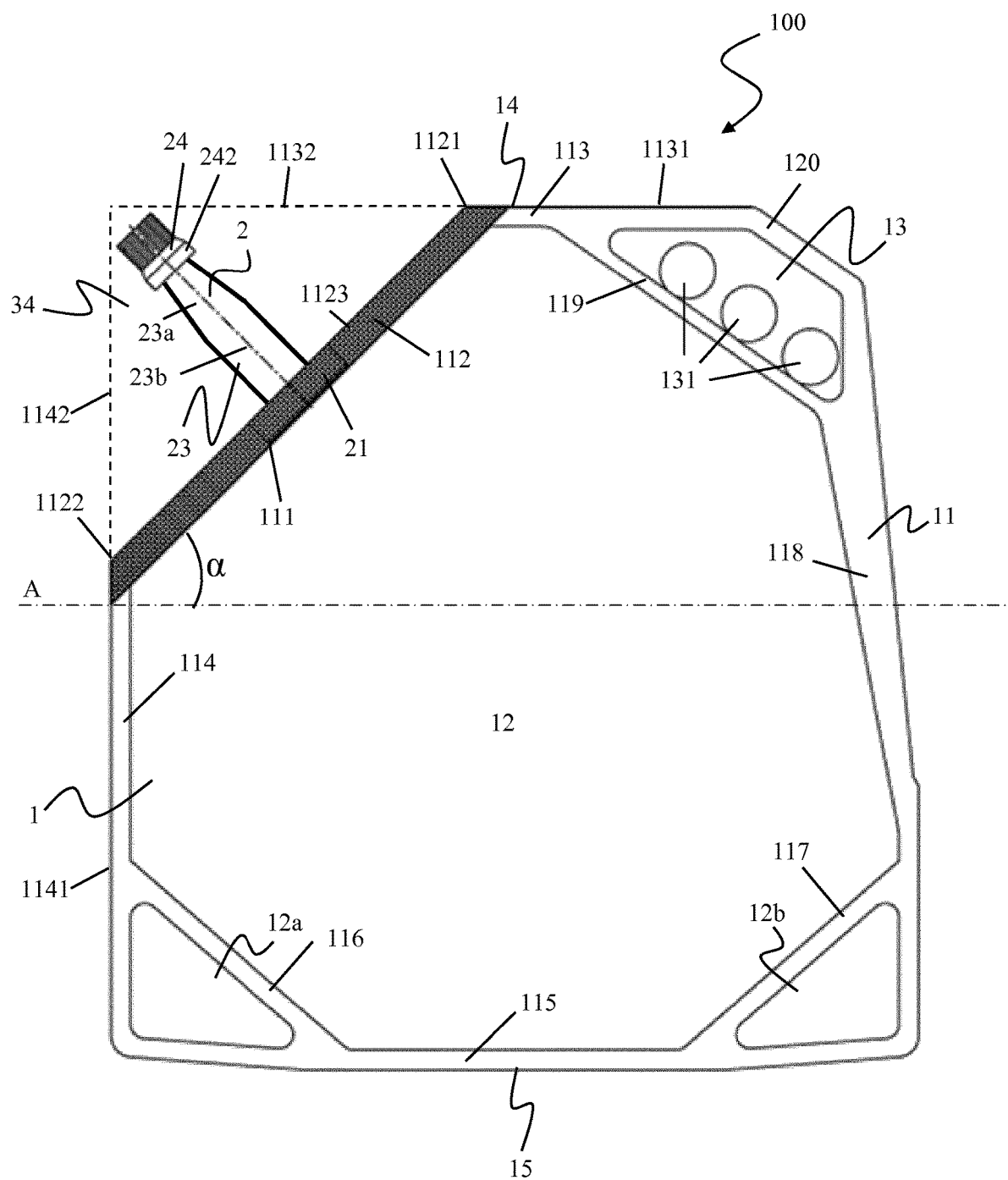
FIG. 1 shows a front view of a pouch assembly comprising a flexible pouch with a spout according to the application in an upright position.

Before the present assembly and system of the application are described in more detail, it is to be understood that this application is not limited to particular assemblies and systems or combinations described, since such assemblies and systems and combinations may, of course, vary. It is also to be understood that the terminology used herein is not intended to be limiting, since the scope of the present application will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, specifically +/−5% or less, more specifically +/−1% or less, and still more specifically +/−0.1% or less of and from the specified value, insofar such variations are appropriate to perform in the disclosed application. It is to be understood that the value to which the modifier "about" or "approximately" refers is itself also specifically disclosed.

Whereas the terms "one or more" or "at least one", such as one or more or at least one member(s) of a group of members, is clear per se, by means of further exemplification, the term encompasses inter alia a reference to any one of the members, or to any two or more of the members, such as, e.g., any ≥3, ≥4, ≥5, ≥6 or ≥7 etc. of the members, and up to all the members.

All references cited in the present specification are hereby incorporated by reference in their entirety. In particular, the teachings of all references herein specifically referred to are incorporated by reference.

Unless otherwise defined, all terms used in disclosing the application, including technical and scientific terms, have the meaning as commonly understood by one of ordinary skill in the art to which this application belongs. By means of further guidance, term definitions are included to better appreciate the teaching of the present application.

In the following passages, different aspects of the application are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present application. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the application, and form different embodiments, as would be understood by those in the art. For example, in the appended claims, any of the claimed embodiments can be used in any combination.

In the present description of the application, reference is made to the accompanying drawings that form a part hereof, and in which are shown by way of illustration only of specific embodiments in which the application may be practiced. Parenthesized or emboldened reference numerals affixed to respective elements merely exemplify the elements by way of example, with which it is not intended to limit the respective elements. It is to be understood that other embodiments may be utilized and structural or logical changes may be made without departing from the scope of the present application. The following detailed description, therefore, is not to be taken in a limiting sense, and the scope of the present application is defined by the appended claims.

The flexible pouch assembly (100) according to the application comprises a spout (2) operably connected to a flexible pouch (1) for holding an aqueous urea solution, hereafter called "liquid", and more in particular AUS32 that is a (32.5±0.7) weight % urea solution in demineralized water, complying with the ISO 22241 standard.

This liquid is used in a selective catalytic reduction system (SCR) system for treating the exhaust gases of an internal combustion engine of a vehicle. At present, only the exhaust gases of internal diesel engines are treated. This does not take away the fact that also the exhaust gases of internal gasoline engines could be treated to reduce the $NO_x$ emissions therein.

As can be seen in FIG. 1 for instance, the pouch assembly (100) comprises a flexible pouch (1) that comprises a wall (11) extending around the flexible pouch (1). This wall (11) surrounds a cavity (12) that is designed to contain the liquid. The wall (11) may be divided into one or more faces (112-118). The faces may be essentially planar. The flexible pouch (1) may have an essentially cuboid shape. One or more of the cuboid edges or vertices may be chamfered or oblique. The chamfered or oblique edge(s) (112) may be essentially planar. FIG. 1 illustrates two adjoining faces (113) and (114) of the wall (11) having a planar chamfered or oblique edge (112). The flexible pouch (1) has a base end (15) and an upper end (14), the base end (15) providing a support for maintaining an upright position of the pouch assembly (100) in a filled state.

The pouch assembly (100) is further provided with a spout (2). The spout (2) is configured for pouring out the liquid content of the flexible pouch (1) and is attached to the flexible pouch (1). The spout (2) is disposed toward the upper end (14) of the flexible pouch (1). In other words, the longitudinal central axis (X) of the spout (2) is disposed in an upward direction when the flexible pouch (1) is considered in an upright position. The longitudinal central axis (X) of the spout (2) may be inclined at an angle of between 30° and 60° in view of the horizontal plane (A) when the flexible pouch (1) is considered in an upright position. More specifically, a longitudinal central axis (X) of the spout (2) may be inclined at an angle of around 45° in view of the horizontal plane A when the flexible pouch (1) is considered in an upright position.

The spout (2) may be attached to a chamfered or oblique edge (112) of the pouch wall (1) which chamfered edge (112) is between a top face (113) and a side face (114) of the pouch wall (11). As can be seen in FIG. 1, the chamfered or oblique edge (112) is a first part of the wall (11) of the pouch (1) that includes the opening (111) into which the base (21) of the spout (2) is integrated. This first part (112) is optionally planar and obliquely arranged with respect to a horizontal plane (A) when the flexible pouch (1) is considered in an upright position. An upright position is typically when the spout (2) is oriented upwards. Typically an upright position is when the base (21) is parallel to a horizontal plane. The horizontal plane may be parallel to a base of the flexible pouch (1) which base is essentially flat providing a upright-standing support.

The spout (2) is provided with a base (21) that is fully integrated into and attached to an opening (111), more specifically a slot-like opening, that is arranged in the wall (11) of the flexible pouch (1). The base (21) has an elongated axial through-passage (211) that serves as a discharge opening for the liquid that is contained in the cavity (12) of the flexible pouch (1). The base (21) elongated axial through-passage (211) is in fluid connection with the flexible pouch cavity (12). The base (21) may have an outer profile that is larger than that of the body (23) or of the top end (22). The base (21) may be provided with an outer profile having a horizontal cross section (B) (see FIG. 3A) with an almond shape.

The spout (2) further comprises a front or top end (22) that is situated at the opposite end of the base (21). The top end (22) has an elongated axial through-passage (221) that serves as a discharge opening for the liquid urea solution towards the outside or exit of the spout (2). The top end (22) elongated axial through-passage (221) is in fluid connection with the base (21) elongated axial through-passage (211). The top end (22) of the elongated axial through-passage (221) is in fluid connection with the flexible pouch cavity (12). The top end (22) may be disposed with an exterior or interior thread (222) for attachment to a cap (24). The top end (22) may have transverse (perpendicular to the longitudinal central axis (X) of the spout (2) cross-sectional profile that is smaller than the minimum cross-sectional profile of the body (23)). The top end (22) may have an outer diameter smaller than the minimum diameter of the body (23). The top end (22) may have an essentially circular outer profile.

A body (23) extends between the base (21) and the top end (22). This body (23) has an elongated shape and has an elongated axial through-passage (231) to serve as a discharge passage for the liquid urea solution. The elongated axial through-passage (231) is in fluid connection with base (21) and top end (22) elongated axial through-passages (211, 221). The body (22) elongated axial through-passage (231) is in fluid connection with the flexible pouch cavity (12).

The body (23) may have a length $L_1$ that is between 4 and 12 times the length $L_2$ of the base (21). More specifically, the body (23) may have a length $L_1$ that is between 5 and 10 times, and most specifically around 6 times the length $L_2$ of the base 21. The respective lengths are measured parallel to a longitudinal central axis (X) of the spout (2).

The body (23) may have a length $L_1$ that is between 2 and 6 times the length $L_3$ of the top end (22). More specifically, the body (23) may have a length $L_1$ that is between 2 and 5 times, and most specifically around 3 times the length $L_3$ of the top end (22).

The respective lengths are measured parallel to a longitudinal central axis (X) of the spout (2).

The body (23) of the spout (2) may have a length $L_1$ in the range 30-182 mm.

The base (21) of the spout (2) may have a length $L_2$ in the range 8-14 mm.

The top end (22) of the spout (2) may have a length $L_3$ in the range 14-22 mm.

The body (23) and top end (22) of the spout (2) may have a combined length $L_1+L_3$ that is equal to or greater than 60-80% of the length of the inside passage (31) of the filling neck (3). The combined length $L_1+L_3$ may be such that the top end (22) at least partially protrudes from or is recessed relative to the tank end end of the filling neck (3). The filling neck (3) may be defined in accordance with ISO 22241. The combined length $L_1+L_3$ may be greater than or equal to 44-56 mm. The combined length $L_1+L_3$ may be less than or equal to 204 mm. The combined length $L_1+L_3$ may be greater than less than or equal to 76 mm.

The respective spout lengths are measured parallel to a longitudinal central axis (X) of the spout (2).

The top end (22) of the spout (2) may have a maximum outer diameter ($D_1$) that is equal to or less than 97% of the diameter of the inner inside passage (31) of the tank filling neck (3) at its narrowest. The filling neck (3) may be defined in accordance with ISO 22241. The top end (22) of the spout (2) may have a maximum outer diameter that is equal to or less than 13-19 mm, preferably 16.5 mm. A minimum outer diameter of the top end (22) of the spout (2) may be 4-5 mm. The outer diameter is measured including any thread.

The body (23) of the spout (2), including any additional protrusion (e.g. ring-shaped protrusion (23c)) or any additional collar, may, where it is to be inserted into the filling neck, have a maximum outer diameter ($D_2$) that is equal to, less than, or no more than 7-10% greater than the diameter of the inner inside passage (31) of the tank filling neck (3) at its narrowest. The filling neck (3) may be defined in accordance with ISO 22241. The body (23) of the spout (2) may have a maximum outer diameter in the range 19 to 21 mm, preferably 19.8 to 20.8 mm, more preferably 19.6 mm to 20.0 mm.

The body (23) of the spout (2), excluding any additional protrusion (e.g. ring-shaped protrusion (23c)) or any additional collar, may, where it is to be inserted into the filling neck, have a maximum outer diameter ($D_2$) that is equal to, or less than the diameter of the inner inside passage (31) of the tank filling neck (3) at its narrowest. The filling neck (3) may be defined in accordance with ISO 22241. The body (23) of the spout (2) may have a maximum outer diameter in the range 17 to 19 mm, preferably 17.5 to 18.5 mm.

The body (23) of the spout (2) may have an outer diameter ($D_3$) where it adjoins the base (21) that is equal to, less than, or no more than 20-22% greater than the diameter of the inner inside passage (31) of the tank filling neck (3) at its narrowest. The filling neck (3) may be defined in accordance with ISO 22241. The body (23) of the spout (2) where it adjoins the base (21) may have an outer diameter in the range 16-24 mm, preferably 19.8 to 20.8 mm, more preferably 19.6 mm to 20.0 mm.

Figures 2, 3, 3A:
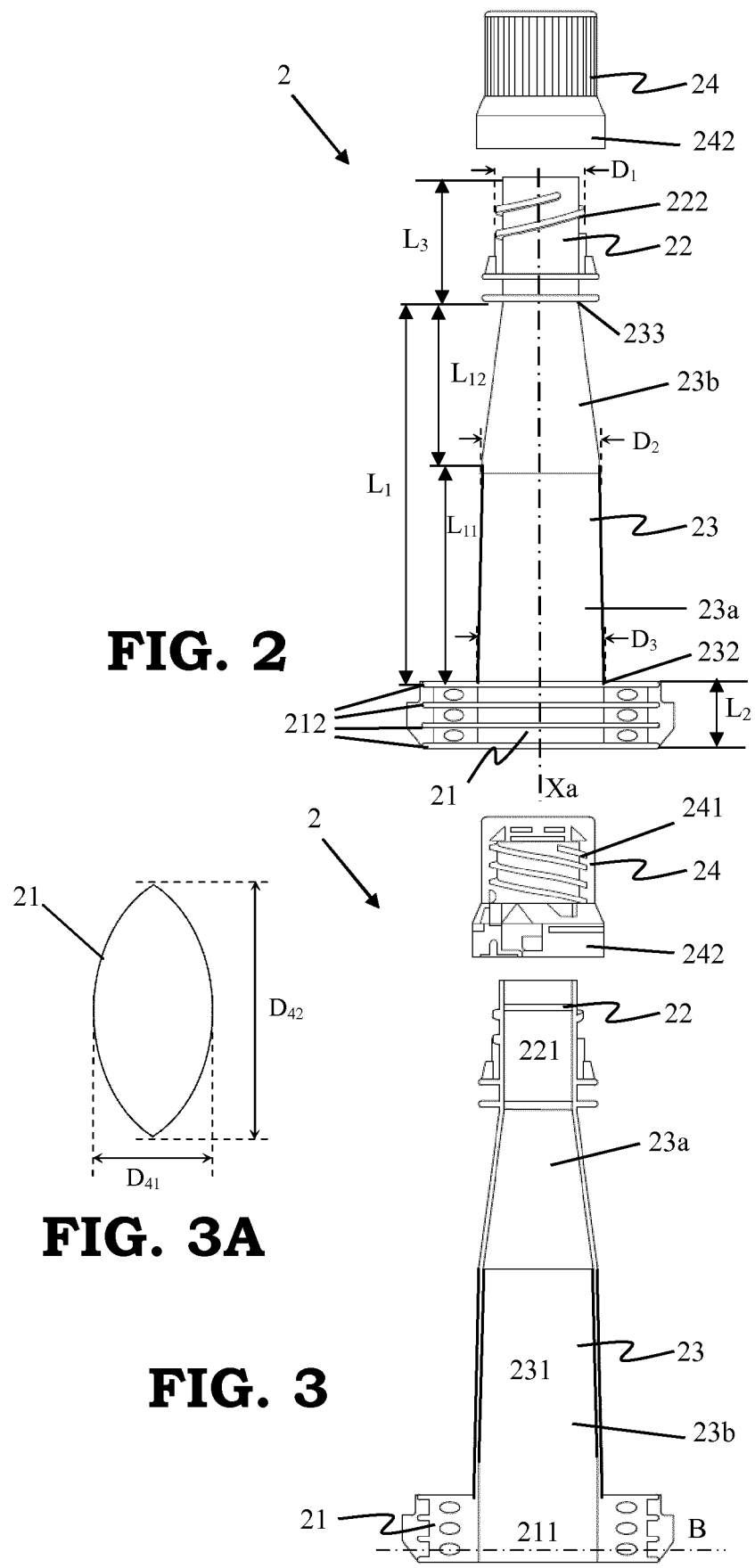
FIG. 2 shows a front view of the spout as shown in FIG. 1.
FIG. 3 shows a longitudinal cross section of the spout as shown in FIG. 2.
FIG. 3A shows a profile a transverse cross-section through the base as shown in FIG. 2.

The base (21) of the spout (2) may have an essentially lozenge or almond shaped transverse profile having two pairs of opposing corners as shown, for instance, in FIG. 3A. It is appreciated that the corners may be rounded. A profile width between the closest pair of opposing corners ($D_{41}$) may be less than a profile length between the most distance opposing corners ($D_{42}$). The ratio profile width:profile length may be 1:2.5-4.5. The profile width may be in the range 12-20 mm. The profile length may be in the range 12-20 mm.

The combined length $L_1+L_3$ may be in the range 74-76 mm, the diameter ($D_1$) of the top end (22) of the spout (2) including thread may be in the range 15-17 mm, the maximum diameter ($D_2$) of the body (23) of the spout (2) including any additional protrusion (e.g. ring-shaped protrusion (23c)) or any additional collar, may, where it is to be inserted into the filling neck, have a maximum outer diameter ($D_3$) in the range 19-21 mm, the body (23) of the spout (2) may have an outer diameter ($D_4$) where it adjoins the base (21) in the range 19-21 mm, the base (21) of the spout (2) may have an essentially lozenge-shaped transverse profile having two pairs of opposing corners where a profile width ($D_{41}$) between the closest pair of opposing corners may be in the range 15-17 mm and a profile length ($D_{42}$) between the farthest pair of opposing corners may be in the range 39-41 mm.

Since the base (21) is integrated into the wall (11) of the flexible pouch (1), and the body (23) and the top end (22) are disposed on the outside of the pouch (1), it can be stated that at least a part of the spout (2) extends outside the flexible pouch (1). By integrated, it is meant that the base (21) at least partly passes through the wall (11) of the flexible pouch (1). The base (21) is attached to the flexible pouch wall (11) to form a liquid impermeable sealing connection.

The spout (2) may be made from one piece, meaning that the base (21), the body (23) and the top end (22) may be inseparably connected to each other, for instance they may be non-releasably connected to each other. The production processes are available to ensure a one piece construction of the spout (2), for instance, injection moulding.

The spout (2) may be rigid. The spout (2) may be rigid along the length of the top end (22) and body (23), and optionally also the base (21).

The spout (2) may be entirely straight (linear) or may contain one or more straight regions. The top end (22) may be straight. The body (23) of the spout (2) may be straight. The base (21) may be straight. More in particular, a longitudinal central axis of the top end (22) and of the body (23) are co-axial. More in particular, a longitudinal central axis of the body (23) and of the base (21) are co-axial. It is foreseen that a longitudinal central axis of the body (23) and of the base (21) are mutually divergent.

As can be seen in FIG. 1, this first part (112) is more specifically inclined at an angle α of between 30° and 60° in view of the horizontal plane (A) when the flexible pouch (1) is considered in an upright position. More specifically, the first part (112) may be inclined under at angle α of around 45° in view of the horizontal plane A when the flexible pouch (1) is considered in an upright position.

Figure 6:
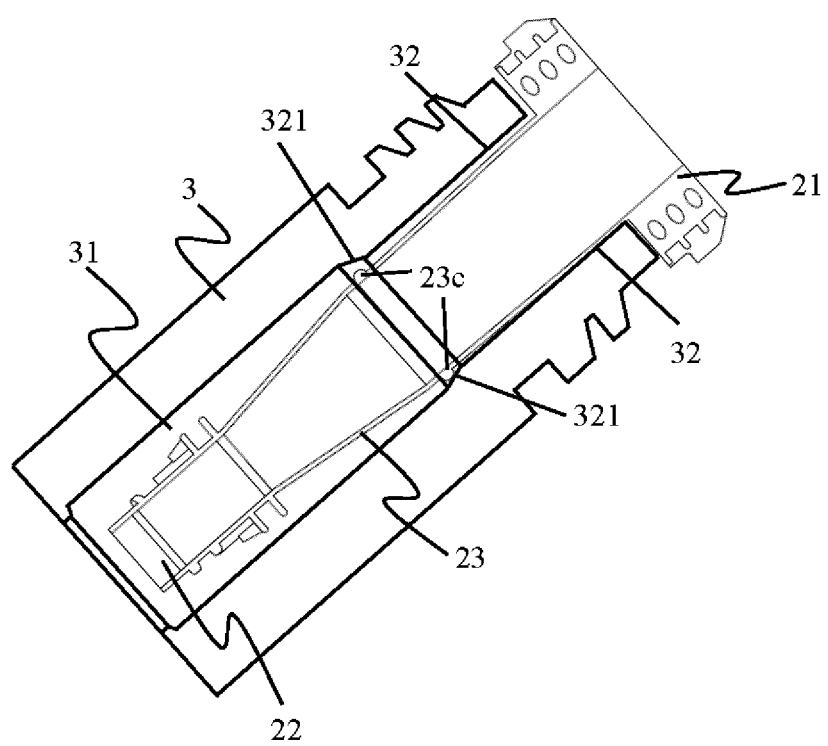
FIG. 6 shows a cross section of the spout as shown in FIGS. 1 and 2 inserted into a tank filling neck of a liquid urea solution tank of a vehicle.

The filling tank of the vehicle (not shown on the drawings) is provided with a tank filling neck (3) having an inside passage (31), as shown for instance in FIG. 6. The tank filling neck (3) may be defined according to ISO 22241. The ISO is preferably ISO 22241-5, also known as ISO/CD 2241-5. During the filling process of the liquid urea solution tank, the top end (22) of the spout (2) as well as at least part of the body (23), and more particular the complete body (23) of the spout (2), extends into the inside passage (31) of the tank filling neck (3). Accordingly, the spout (2) may be configured such that at least part of the body (23), and more particular the complete body (23) of the spout (2), engages with the inside passage (31) of the tank filling neck (3).

During the filling process of the liquid urea solution tank of the vehicle, the liquid contained in the flexible pouch (1) will flow through the through-passage (211) of the base 21, through the through-passage (223) of the body (23), through the through-passage (221) of the top end (22) into the tank filling neck (3), and finally into the liquid tank.

In an embodiment, the top end (22) of the spout (2) is releasably closable by a cap (24) as shown, for instance in FIGS. 2 to 5. The top end (22) of the spout (2) may be repeatably releasably closable by the cap (24). The spout top end (22) may be configured for coupling to a cap (24) for the releasable closure of the spout (2) by the cap (24). More specifically, the top end (22) of the spout (2) and the cap (24) may be provided with a corresponding or co-operating screw thread (222) and (241) to screw the cap (24) on and off the top end (22) of the spout (2)—in other words for releasable closure of the spout (2). The body (23) is particularly unthreaded.

The cap (24) may be provided with a tamper-evidence ring (242) which stays connected to the cap (24) (and not to the spout 2) when the cap (24) is unscrewed from the spout (2). The tamper-evidence ring (242) may be at least partly rigidly connected to the cap (24). The tamper-evidence ring (242) may be non-releasably connected to the cap (24).

In an embodiment, the base (21) of the spout (2) is welded directly in the opening (111) provided in the wall (11) of the flexible pouch (1) via, for example, a thermal weld. In this way, the base (21) is permanently attached to the opening (111).

Furthermore, the flexible pouch (1) together with the spout (2) are formed essentially of one piece, benefiting the handling of the flexible pouch (1) with spout (2) i.e. the pouch assembly (100).

A permanent connection between the base (21) and the opening (111) may also be produced by other methods of heat transport such as hot sealing or adhesive bonding. In order to have a solid welding connection, the base (21) is in a material that is compatible with the material of the flexible pouch (1).

Figure 4:
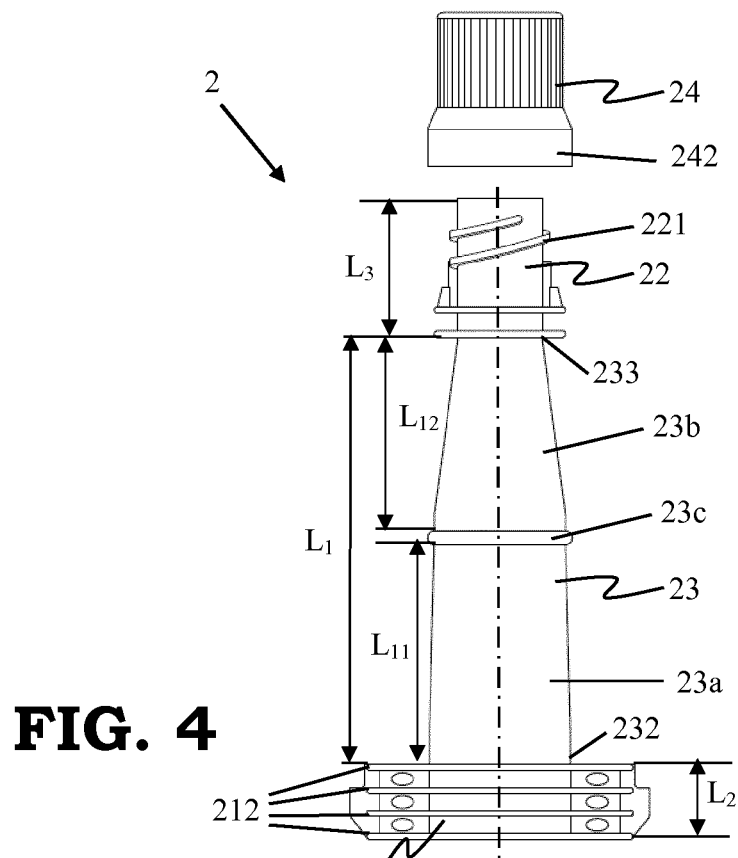
FIG. 4 shows a front view of the spout as shown in FIG. 1 with a ring-shaped protrusion on the body of the spout.

In the particular embodiment as shown in FIGS. 2 to 5, the base (21) has a number of welding ribs or fins (212) that are axially spaced from each other and that are formed as one piece with the remainder of the base (21), as shown for instance, in FIGS. 2 and 4. Such fins (212) are disposed on the outside of the base. These welding fins (212) protrude outwardly from the outer surface of the base (21) and extend around the outer surface of the base (21). The fins (212) may have an essentially annular form.

The outer surface of the body (23) of the spout (2) may be essentially smooth. It may be devoid of additional collars or rings. Alternatively, it may be provided with at least one additional collar or ring to assist, for instance, with a fitting engagement with the tank filling neck (3), or for refilling. As can be seen in the figures, in an embodiment of a pouch assembly (100), the body (23) of the spout (2) is disposed with a ring-shaped (annular) protrusion (23c) extending at least partially around a circumference of the outer body of the spout (2), and wherein the tank filling neck (3) may have on the inside passage (31) disposed with at least one protrusion (32) configured to co-operate with the spout ring-shaped protrusion (23c) for releasable latching of the spout in the tank filling neck (3). The latching connection fixes the body (23) of the spout (2) and the tank filling neck (3) in slidable relation which can be overcome by the application of addition sliding force. The latching together and/or apart of the parts may be accompanied by a "click" sound indicative of the ring-shaped protrusion (23c) sliding past the protrusion (32) disposed in the inside passage (31) of the tank filling neck (3).

Figure 5:
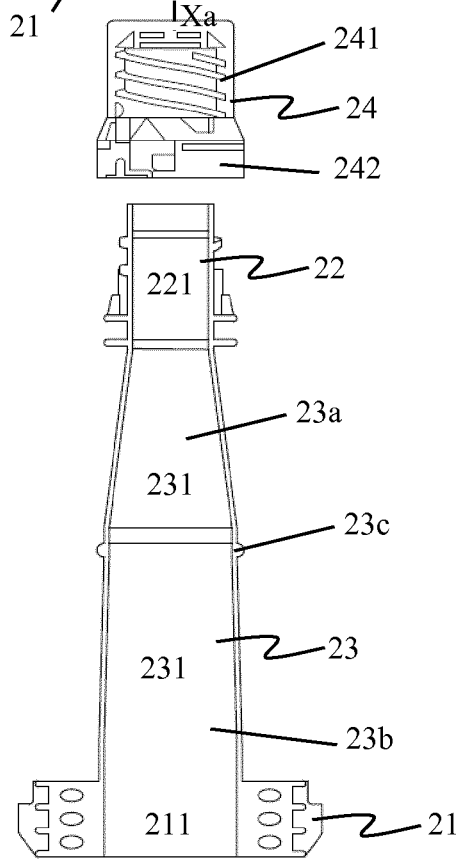
FIG. 5 shows a longitudinal cross section of the spout as shown in FIG. 4.

In an optional embodiment, the body (23) of the spout (2) may be provided with a ring-shaped protrusion (23c) that extends at least partially around the circumference of the body (23), and optionally completely around the circumference of the body 23, as shown for instance, in FIGS. 4 and 5. The tank filling neck 3 may have on the inside passage (31) thereof:
  either one protrusion (32) that protrudes to the inside passage (31) of the tank filling neck (3) and that extends for an axial portion of the inside passage (31) over a complete circumference of the inside (31) of the tank filling neck (3)—in other words a continuous protrusion, or
  a plurality of protrusions (32) in the form of elongated ribs that extend axially in the inside passage (31) of the tank filling neck (3) for an axial portion of the inside passage (31) and that protrude in the inside passage (31) of the tank filling neck (3).

An exemplary filling tank neck is shown in FIG. 6.

Each of these protrusions (32) may have a latching edge (321) (FIG. 6). The latching edge (321) is an edge of the protrusion (32) most distance from an entry to the tank filling neck (3); it engages with the ring-shaped protrusion (23c) to limit movement of the spout (2) relative to the neck (3). The latching edge (321) may be bevelled relative to the wall of the neck inner passage (31). When the spout (2) is inserted in the inside passage (31) of the tank filling neck (3), the ring-shaped protrusion (23c) clicks over the latching edge (321) of the one or more protrusions (31), thereby latching the spout (2) within the inside passage (31) of the tank filling neck (3). When retracting the spout (2) from of the inside passage (31) of tank filling neck (3), the ring-shaped protrusion (23c) clicks again over the latching edge (321) of one or more protrusions (32) through which the spout (2) can be released out of the tank filling neck (3) again. In other words, the ring-shaped protrusion (23c) of the body (23) is arranged to releasable click over the latching edge (321) of the one or more protrusions (32) that are provided in and are protruding in the inside (31) of the tank filling neck (3). In an embodiment, the ring-shaped protrusion (23c) is such that clicking of the ring-shaped protrusion (23c) over the under-edge (321) of the ribs (32) allows that the spout (2) can easily be put in and taken out again of the tank filling neck (3).

Owing to the presence of the one or more protrusions (32) on the inside passage (31) of the tank filling neck (3), and the shape of the body (23) and the top end (22) of the spout as described above, vapours that are released during the filling of the liquid urea solution tank can still escape from the tank filling neck (3).

The body (23) of the spout (2) may have a lower end (232) that is connected to the base (21) of the spout (2) and an upper end (233) that is connected to the top end (22) of the spout (2) as shown, for instance, in FIGS. 2 to 5. The body (23) may have a diameter that decreases gradually from the lower end (232) to the upper end (233) thereof. The body (23) may have one or more regions of gradual diameter reduction from the lower end (232) to the upper end (233) thereof. In other words, the body (23) may contain one or more regions that are tapered, the wider end of the taper being towards the lower end (232) of the body (23).

In a possible embodiment as shown in FIGS. 2 and 3, the body (23) of the spout (2) may be divided over its length in a first body part (23a) and a second body part (23b) that are in connection to each other and each have a diameter that decreases gradually from the lower end (232) to the upper end (233) of the spout (2). The decrease in diameter of the second body part (23b) towards the front side (233) of the body (23) may be bigger than the decrease in diameter of the first body part (23a) starting from the lower end (232) of the body (23).

If a ring-shaped protrusion (23c) is present, as is shown in FIGS. 4 and 5, it may divide the body (23) of the spout (2) into a first body part (23a) extending between the lower end (232) of the body (23) and the ring-shaped protrusion (23c), and a second body part (23b) extending between the ring-shaped protrusion (23c) and the upper end (233) of the body (23) of the spout (2) as shown for instance in FIGS. 2 and 3. The decrease in diameter of the second body part (23b) from the ring-shaped protrusion (23c) towards the front side (233) of the body (23) is bigger than the decrease in diameter of the first body part (23a) from the lower end (232) of the body (23) towards the ring-shaped protrusion (23c). The first (23a) and second (23b) body parts may each contain a region of gradual diameter reduction from the lower end (232) to the upper end (233). A graduality of diameter reduction in the second body part (23b) may be greater than that in first body part (23a). The graduality refers to a gradient i.e. to a rate of change of diameter as a function of body length. The maximum diameter in the first body part (23a) in the region of gradual diameter reduction may be greater than the maximum diameter in the second body part (23b) in the region of gradual diameter reduction. The maximum diameter in the first body part (23a) in the region of gradual diameter reduction may be equal to or greater than the minimum diameter in the second body part (23b) in the region of gradual diameter reduction.

The first body part (23a) may have a length $L_{11}$ that may be between 0.5 and 2 times the length $L_{12}$ of the second body part (23b) of the spout (2). More specifically, the first body part (23a) has a length $L_{11}$ that may be between 0.8 to 1.5 times, and most specifically around 1.2 times the length $L_{12}$ of the second body part (23b). The respective lengths are measured parallel to a longitudinal central axis (X) of the spout (2).

In an embodiment of a pouch assembly (100), the body of the spout (2) and/or the top end (22) of the spout (2) have a tubular shape, specifically a cylindrical shape. The diameter of the cylinder may or may not be uniform as a function of its length; as mentioned earlier it may contain one or more regions of gradually changing diameter. The spout (2) may have another shape, but with the condition that the top end (22) and at least a part of the base (21) of the spout (2), more particularly the whole body (23) of the spout (2), is insertable into the filling neck of the vehicle tank.

In a possible embodiment, the flexible pouch assembly (100) is configured such that the spout (2) is attached to a first part (112) of the flexible pouch wall (11) the first part (112) disposed between adjacent or adjoining second part (113) and third part (114) of the flexible pouch wall (11) wherein each of the first (112), second (113) and third (114) parts are oriented such that fictive planes contacting and parallel to and extending from each of the first (112), second (113) and third (114) parts outer surface intersect to form a geometric space (14). The geometric space (34) may have a triangular profile (cross section). The geometric space (34) may have triangular prism shape. The top end of the spout, more specifically the top end of the spout together with the cap, even more specifically, the body of the spout together with the cap are contained within the geometric space. The second part (113) may be a top face of the flexible pouch (1) and the third part (114) may be a side face of the flexible pouch (1).

According to one aspect, the flexible pouch (1) wall (11) comprises two side walls joined by an edge wall; the first part (112), second part (113) the third part (114) may disposed on the edge wall.

According to one aspect, the flexible pouch (1) has an essentially cuboid shape, wherein the spout (2) is disposed on a chamfered or oblique edge (112) between two faces (113, 114), and the geometric space (34) is formed by the intersection of fictive planes contacting, parallel to and extending from the outer surface of each of the chamfered edge (112) and the faces (113, 114). The chamfered or oblique edge (112) may be essentially planar. The two faces correspond to the second (113) and third (114) parts and the chamfered or oblique edge corresponds to the first part (112).

According to another aspect, the flexible pouch (1) has an essentially rectangular shape in the flattened, unfilled state, wherein the spout (2) is disposed on a chamfered or oblique edge (112) between two edges (113, 114), and the geometric space (34) is formed by the intersection of fictive lines contacting, parallel to and extending from the aforementioned. The oblique or chamfered edge (112) may be essentially linear. The two edges correspond to the second (113) and third (114) parts and the oblique edge corresponds to the first part (112).

In view of efficient packaging as well as on-the-shelf space usage at a point-of-sale of the flexible pouches (1) with spout (2), the cap (24) that is placed on the top end (22) of the spout (2) and the body (23) of the spout (2) are extending within this space (14). In other words, the spout (2) with the screwed on cap (24) does not protrude outside the space which the overall flexible pouch (1) occupies.

In another possible embodiment assembly, the first part (112) of the flexible pouch (1) wall (11) has an outer side (1123), and at a first end (1121) thereof is connected to the second part (113) of the pouch wall (11), and at second, opposite end (1122) thereof is connected to a third part (114) of the pouch wall (11). This second part (113) has an outer side (1131) and this third part (114) has an outer side (1141). When the outer side (1123) of the first part (112), the imaginary extension (1132) of the outer side (1131) of the second part (113) and the imaginary extension (1142) of the outer side (1141) of the third part 114 are considered, these form an imaginary triangular space (34).

The flexible pouch (1) may be formed from two or more adjacent film-like sheets of a plastic material that are sealed to each other by means of heat sealing. Each of the sheets may be made from the same or from different materials focussing on different necessary properties such as printing precision properties, protrusion protection properties, sealing properties, etc.

In an embodiment, the sheets are made from a thermal plastic material that are heat sealed to each other at their respective outer edges thereby forming the wall (11) of the flexible pouch (11) that encloses the cavity (12). According to one aspect, a seal runs around edge of the wall, in particular across a face of the first part (112) of the wall (11)

The pouch assembly (100) may be provided with a handle (13). The handle may be disposed within an oblique or chamfered edge of the flexible pouch (1). The oblique or chamfered edge may be disposed opposite the spout on an upper side of the flexible pouch (1) as shown for instance, in FIG. 1. This handle (13) may be integrated into the surface of the flexible pouch (1) and surrounded by the parts (118), (119), (120) and (113) of the wall (11) of the flexible pouch (1).

The handle (13) may be provided with a number of holes (131), for instance three as shown for instance in FIG. 1, that each are accommodated to receive a finger of the user.

This handle (13) enables an easy and comfortable handling of the pouch assembly (100). It allows that the pouch assembly (100) can easily be carried by the end user thereof and allows that it is easy to put the spout (2) into the filling neck of the liquid urea solution tank of the vehicle. The handle being disposed on an upper side or edge of the flexible pouch (1) further prevents spillage from the spout when the pouch is filled with the liquid; support of the pouch from the base or side wall can apply additional external force to the flexible wall and result in an unwarranted expulsion and spillage of liquid. The handle being disposed on an upper side or edge of the flexible pouch (1) avoids touching of the side wall. Combined with the pivot region on the spout (2), the handle (13) allows a one handed operation including tilting and engagement without having to compress the flexible pouch (1) base or side wall until after engagement with the filling neck.

The pouch assembly (100) may be provided with a number of supporting flaps at a base of the flexible pouch (1) as shown for instance in FIG. 1. At the left side of the flexible pouch (1) there may be provided two supporting flaps (12a), one at the front and one at the back of the flexible pouch (1) At the right side of the flexible pouch (1) there may also be provided supporting flaps (12b), also one at the back and one at the front of the flexible pouch (1). These supporting flaps (12a) and (12b) allow the flexible pouch (1) to remain upright when the flexible pouch (1) is filled and in an upright position. The supporting flaps (12a) and (12b) may be integrated into the surface of the flexible pouch (1). The left supporting flaps (12a) are surrounded by the parts (115), (114) and (116) of the wall (11) of the pouch (1). The right supporting flaps (12b) are surrounded by the parts (115), (117) and (118) in FIG. 1.

In an embodiment, a system is provided for treating the exhaust gases of an internal combustion of a vehicle using a liquid being an aqueous urea solution, the system comprising
  a liquid tank located in the vehicle, the liquid tank having
    a tank filling neck (3) for filling the liquid tank with the liquid from the outside of the liquid tank, and
  a pouch assembly (100) as described herein.

In order to fill the liquid tank of a vehicle with aqueous urea solution contained in the pouch (1), the user preferably puts three fingers into the handle (13) of the pouch (1). It is however also possible to grab the pouch (1) with both hands. Thereafter, the pouch (1) with the spout (2) is tilted and pivoted by the user towards the opening of the filling tank neck (3). In this way, the liquid contained in the flexible pouch (1) will flow into the spout (2) and pour out of the spout (2) into the liquid tank. Once the spout (2) is substantially inserted into the tank filling neck (3), transfer of liquid proceeds safely and without spillage; pressure may be applied to the flexible pouch (1) to expedite transfer. When the liquid tank (AdBlue tank) is located next to the diesel tank in the vehicle, then the oblique or chamfered edge (112)

of the pouch (1) is in most cases in contact with the outer side of the vehicle and/or the inner side of the filling compartment for the diesel and AdBlue tank located behind a flap provided in the outside of the vehicle. If the liquid tank however is located somewhere else in the vehicle, for instance below the vehicle hood or in the trunk of the vehicle, there is in general no contact of this oblique or chamfered edge (112) with the vehicle. The flexible pouch (1) allows the user to apply light pressure without significant resistance to expedite pouring, and occupies a small volume for disposal. The user can consequently either completely empty the pouch (1) or partially empty the pouch (1) by taking the spout (2) back out of the tank filling neck (3). When there is still liquid left in the pouch (1), the spout (2) can be releasably closed by screwing the cap (24) on the top end (22) of the spout (2).

The flexible pouch (1) with spout (2), i.e. the pouch assembly (100), as described above, is particularly suitable to be used for filling of the liquid tank of a passenger vehicle, however not excluding that it also can be used for filling the liquid tank of other vehicles.

The invention claimed is:

1. A pouch assembly (100) containing a liquid being an aqueous urea solution for use in a selective catalytic reduction system for treating exhaust gases of an internal combustion engine of a vehicle and for transferring the liquid to a liquid tank of the vehicle, the pouch assembly (100) comprising a flexible pouch (1) and a spout (2) attached thereto, wherein at least a part of the spout (2) extends outside the flexible pouch (1) and is arranged to dispense the liquid contained in the flexible pouch (1) into the liquid tank of the vehicle via a tank filling neck (3) configured to receive the spout (2), wherein the spout (2) is formed of one piece and comprises
 a base (21) having an elongated axial through-passage (211) to serve as a discharge passage for the liquid, the base (21) extending axially through an opening (111) provided in a wall (11) of the pouch (1) and being attached to the opening (111), wherein the wall (11) of the pouch (1) comprises a first part (112) that includes the opening (111) into which the base (21) of the spout (2) is integrated, this part being obliquely arranged with respect to a horizontal plane (A) when the flexible pouch (1) is considered in an upright position, and
 a top end (22) having an elongated axial through-passage (221) in fluid connection with the base (21) elongated axial through-passage (211), the top end (22) configured for insertion into the filling neck of the liquid tank for transfer of the liquid into the liquid tank;
wherein the spout (2) further comprises a body (23) that
 extends between the base (21) and the top end (22) of the spout (2),
 has an elongated shape,
 has an elongated axial through-passage (231) in fluid connection with base (21) and top end (22) elongated axial through-passages (211, 221), and
 is configured to at least partially extend into the tank filling neck (3) of the liquid tank for the transfer of liquid into the liquid tank; and
wherein the pouch assembly (100) is configured such that the spout (2) is attached to the first part (112) of the wall (11), the first part disposed between adjacent second (113) and third (114) parts of the wall (11) wherein each of the first (112), second (113) and third (114) parts are oriented such that fictive planes contacting the outer surface of each of the first (112), second (113) and third (114) parts intersect to form a geometric space (34) wherein the body (23) of the spout (2) together with a cap (24) for releasable closure of the spout (2) are contained within the geometric space (34).

2. The pouch assembly (100) according to claim 1, wherein the base (21) of the spout (2) is permanently attached to the opening (111) provided in the wall (11) of the flexible pouch (1).

3. The pouch assembly (100) according to claim 1, wherein a longitudinal central axis (X) of the spout (2) is disposed in an upward direction when the flexible pouch (1) is considered in an upright position.

4. The pouch assembly (100) according to claim 1, wherein the body (23) of the spout (2) has a lower end (232) that is connected to the base (21) of the spout (2) and a upper end (233) that is connected to the top end (23) of the spout (2), wherein the body (23) has one or more regions of gradual diameter reduction from the lower end (232) to the upper end (233) thereof.

5. The pouch assembly (100) according to claim 1, wherein the body (23) of the spout (2) over its length is divided in a first body part (23a) and a second body part (23b), the first (23a) and second (23b) body parts each containing a region of gradual diameter reduction from the lower end (232) to the upper end (233), a graduality of diameter reduction in the region of the second (23b) body part being greater than that in the region of the first (23a) body part.

6. The pouch assembly (100) according to claim 1, wherein the spout top end (22) is configured for coupling to the cap (24) for releasable closure of the spout (2).

7. The pouch assembly (100) according to claim 6, wherein the top end (22) of the spout (2) and the cap (24) are each provided with a co-operating screw thread (222, 241) for repeatable releasable attachment of the screw the cap (24) to the spout (2).

8. The pouch assembly (100) according to claim 6, wherein the cap (24) is provided with a tamper-evidence ring (242) which maintains connection with the cap (24) when the cap (24) is released from the spout (2).

9. The pouch assembly (100) according to claim 1, wherein the body (23) of the spout (2) is configured to extend completely into the tank filling neck (3) during transfer of liquid to the liquid tank.

10. The pouch assembly (100) according to claim 1, wherein the body (23) has a length ($L_1$) that is between 4 and 12 times the length ($L_2$) of the base (21) of the spout (2).

11. The pouch assembly (100) according to claim 5, wherein the first body part (23a) has a length ($L_{11}$) that is between 0.5 and 2 times the length ($L_{12}$) of the second body part (23b) of the spout (2).

12. A system for treating the exhaust gases of an internal combustion of a vehicle using a liquid being an aqueous urea solution, the system comprising
 a liquid tank located in the vehicle, the liquid tank having a tank filling neck (3) for filling the liquid tank with the liquid from the outside of the liquid tank, and
 a pouch assembly (100) according to claim 1.

13. The pouch assembly (100) according to claim 1, wherein the body (23) has a length ($L_1$) that is between 2 and 6 times the length ($L_3$) of the top end (22) of the spout (2).

* * * * *